US008649375B2

(12) United States Patent
Capello et al.

(10) Patent No.: US 8,649,375 B2
(45) Date of Patent: Feb. 11, 2014

(54) METHOD AND DEVICES FOR MULTICAST DISTRIBUTION OPTIMIZATION

(75) Inventors: Alessandro Capello, Turin (IT); Paolo Salamandra, Turin (IT); Alberto Tempia Bonda, Turin (IT)

(73) Assignee: Telecom Italia S.p.A., Milan (IT)

( * ) Notice: Subject to any disclaimer, the term of this patent is extended or adjusted under 35 U.S.C. 154(b) by 367 days.

(21) Appl. No.: 12/995,377

(22) PCT Filed: May 30, 2008

(86) PCT No.: PCT/EP2008/004314
§ 371 (c)(1),
(2), (4) Date: Nov. 30, 2010

(87) PCT Pub. No.: WO2009/143862
PCT Pub. Date: Dec. 3, 2009

(65) Prior Publication Data
US 2011/0085546 A1 Apr. 14, 2011

(51) Int. Cl.
H04L 12/28 (2006.01)
H04L 12/56 (2011.01)
H04L 1/00 (2006.01)
H04L 12/26 (2006.01)

(52) U.S. Cl.
USPC .......................................... 370/390; 370/236

(58) Field of Classification Search
USPC ................... 370/235, 236, 390, 392
See application file for complete search history.

(56) References Cited

U.S. PATENT DOCUMENTS

| 6,662,308 | B1 * | 12/2003 | Baroni et al. ................... 714/4.1 |
| 2003/0223466 | A1 | 12/2003 | Noronha et al. |
| 2005/0136972 | A1 * | 6/2005 | Smith et al. ................. 455/554.1 |
| 2006/0120346 | A1 * | 6/2006 | Kitamura et al. ............. 370/351 |
| 2006/0250999 | A1 | 11/2006 | Zeng et al. |
| 2007/0153790 | A1 | 7/2007 | Boers et al. |
| 2007/0177593 | A1 | 8/2007 | Kompella |
| 2008/0002669 | A1 | 1/2008 | O'Brien et al. |
| 2008/0031130 | A1 | 2/2008 | Raj et al. |
| 2008/0176552 | A1 | 7/2008 | Hamano et al. |
| 2008/0189184 | A1 * | 8/2008 | Kubo et al. ..................... 705/16 |

OTHER PUBLICATIONS

International Search Report dtd Feb. 2, 2009, PCT/EP2008/004314.

* cited by examiner

Primary Examiner — Ronald Abelson
(74) Attorney, Agent, or Firm — Banner & Witcoff, Ltd.

(57) ABSTRACT

Multicast information flows are distributed from a source to user terminals over a network including aggregation routers arranged in hierarchical levels. Once a request for a given information flow is received from a user terminal, a distribution path can be defined through a plurality of aggregation routers. At one or more of the aggregation routers traversed by the information flow an information subflow can be derived to be propagated also towards lower-level aggregation routers that are not traversed by the information flow being distributed. Further requests for the same information flow received through an aggregation router towards which the information subflow was propagated are forwarded towards an aggregation router where the subflow was derived.

9 Claims, 5 Drawing Sheets

METHOD AND DEVICES FOR MULTICAST DISTRIBUTION OPTIMIZATION

CROSS REFERENCE TO RELATED APPLICATIONS:

This is a U.S. National Phase Application under 35 U.S.C. §371 of International Application No. PCT/EP2008/004314, filed May 30, 2008, which was published Under PCT Article 21(2), the entire contents of which are incorporated herein by reference.

FIELD OF THE INVENTION

This disclosure relates to the optimization of multicast distribution.

This disclosure was devised by paying specific attention to its possible use for multicast distribution of media contents. Reference to this possible field of use is not however to be construed in a limiting sense of the scope of this disclosure.

DESCRIPTION OF THE RELATED ART

A most common form of data transfer in telecommunication networks is transmission from a single source to a single receiver. This form of data transfer is defined "unicast" transmission.

Certain services exist where the data transmitted from a source may be received by a plurality of receivers (e.g. by a subset of, not necessarily all, the receivers in a network). This form of data transfer is defined "multicast" transmission and corresponds to a scheme of communication "from one to many".

Telecommunication networks based on the IP protocol may manage both types of data transfer. In the case of multicast transmission, the source of the traffic (for example a video server) may specify an IP multicast address as the destination of the traffic packets. An IP multicast address may identify a so-called "multicast group", that is a flow of data packets intended to be received by a plurality of terminals (for example one or more Set Top Boxes or Personal Computers).

IP multicast addresses correspond to the so-called IP D class of the space of addresses, namely to the interval 224.0.0.0-239.255.255.255. A terminal that intends to receive the packets sent with a determined multicast destination address may expressly request this from the telecommunications network, thus producing a so-called Join message. The network may thus be configured in order to transmit to that terminal the packets belonging to the corresponding multicast group.

Multicast transmission over an IP network may use (i) a management protocol for managing the multicast groups; this protocol will be responsible for managing the Join requests from the terminals towards the routers of the IP network, and (ii) a routing protocol; this protocol will be responsible for configuring the transmission path of the packets from the source to the (plural) receivers.

A commonly used protocol for managing multicast groups is the Internet Group Management Protocol (IGMP). By means of this protocol the terminals may request (via a Join request) that they should be included in a specific multicast group for reception or (via a Leave request) that reception should be interrupted. These activities may involve an exchange of signalling packets between the terminals and the IP routers to which they are connected.

From the viewpoint of transmission of the multicast packets, these routers are the last ones to be traversed before reaching the receivers; they are thus referred to as "last-hop" routers.

The multicast routing protocols have the task of calculating and configuring the path followed by the multicast packets from the source to the (multiple) receivers. From a topological viewpoint, the path corresponds to a tree, and may thus be referred to as a multicast distribution tree.

In general terms, a multicast distribution tree can be calculated once all the receivers are known or the single receivers may be added as they send their Join requests. In the former case, different strategies may be resorted to for calculating the path: exemplary strategies may be e.g. optimizing the distance between the source and the receivers or minimizing the network resources occupied. In the latter case, it is always possible to minimize the distance between the source and the receivers, while applying other optimization criteria may be difficult, as this may require reconfiguring the whole distribution tree when an individual receiver is added or removed.

A common multicast routing protocol is the Protocol Independent Multicast—Sparse Mode (PIM-SM). In PIM-SM the multicast distribution tree is constructed moving from the last-hop router (i.e. the leaves of the tree) towards the source (i.e. the root of the tree), e.g. based on the concept that a link is traversed by a multicast flow only if at least one receiver downstream has asked for that flow via Join procedure. The algorithm for constructing the tree optimizes the distance between the source and the receivers and the calculation is distributed over the routers in the network: after receiving a Join request, each router will propagate it toward the source, by choosing as the "next" router (called upstream router in PIM terminology) the neighbour router which is nearest to the source. This is done on the basis of the information contained in the unicast routing table.

The PIM-SM protocol may lead to constructing two different types of distribution trees: shared-trees and source or SPT-trees.

Shared trees may be common to (and thus shared by) plural multicast groups, even with different sources; their construction is based on a router selected out of the routers in the network and designated Rendezvous Point (RP). This has the role of establishing communication between the receivers and the source(s), which—at least at the beginning—are not cognizant of one another. Construction of a shared tree involves two phases: the traffic sources communicate their presence to the RP in a registering step, and the receivers send their Join requests toward the RP by using the optimum path calculated by the unicast routing protocol (for example Open Shortest Path First or OSPF and Intermediate System to Intermediate System or ISIS). In order to construct a shared tree in a correct way all the nodes in the network should know the identity of the RP and be able to reach it. The RP, being aware of the requests from the receivers and knowing the active sources, can establish communication between the two segments of the tree, by enabling end-to-end transmission of the multicast traffic flow. Such a tree, being shared by plural multicast groups, it is not, in general, an optimal one from the viewpoint of the path length.

Conversely, source trees, by their very designation, are specific to each source of multicast traffic. The paths between the source and the receivers are optimal in terms of distances and their construction is based on the assumption that the receivers know the IP address of the source of the multicast group.

This condition can be fulfilled in two ways:
- a shared-tree is initially constructed and the receivers begin to receive the multicast packets; they can thus read therein the IP address of the source and construct a tree which is optimum for that source;
- the receivers know from the very beginning the address of the source (for example through an explicit configuration) and can directly construct a SPT-tree.

The PIM-SM protocol uses the former approach considered in the foregoing; nevertheless, a variation exists, called PIM Source Specific Multicast (PIM-SSM), that allows to adopt the latter approach if the receivers know the IP address of the source.

A flow of multicast traffic is generally identified by a couple of values (S, G), where G represents the address of the multicast group and S is the IP address of the source of traffic. In the case where the identity of the source of the multicast flow is not known, the group is identified as (*, G).

In a typical network layout of an Internet Service Provider (ISP), the last-hop routers are interconnected with the rest of the network, and thus with the multicast source, through one or more aggregation levels. The whole set of apparatus involved is currently designated aggregation or harvest network.

FIG. 1 herein is a schematic representation of an aggregation or harvest network architecture between a source S and a plurality of receivers (i.e. user terminals) R. The network includes a (lowest) level of last-hop router L1 to L4, and two higher aggregation levels comprised of routers F1 to F3 and A1, A2, respectively.

Each router in the network can be connected to one or more routers at an "upper" level. The routers in the higher aggregation levels (i.e. routers F1 to F3 and A1, A2) can be connected to one or more routers at a "lower" level. The last-hop routers L1 to L4 have no "lower" level router to be connected to.

The connections among the aggregation routers and the rest of the network may be geographical links over DWDM (Dense Wavelength Division Multiplexing) systems. These involve expensive and valued resources; an objective of the ISP is to optimize use of these resources.

As previously described, in the case of multicast transmissions, the IGMP protocol manages the Join requests between the receivers and the last-hop router; the last-hop routers may use the PIM-SM or PIM-SSM protocol to construct the multicast distribution tree up to the source(s). In the case where plural paths exist, each router may independently select one of them. In various network scenarios, a same flow can be propagated over plural parallel paths, which leads to wasting the resources in the network (i.e. occupying an amount of bandwidth in excess the necessary bandwidth).

For instance, in the scenario exemplified in FIG. 1, some last-hop routers (e.g. router L1, L2, and L3) are directly connected to two of the upper level routers (routers F1 to F3): any of these last-hop routers will thus choose one of F1 to F3 as the upstream router for sending the Join messages. Likewise, some of the upper level routers (e.g. F2 and F3) are in turn connected to both the top-level aggregation routers A1, A2. Again F2 and F3 will choose either of A1 or A2 for dispatching the (harvested) Join messages.

As indicated, the upstream router may be selected on the basis of the routing information of the unicast protocols. The router closer/closest to the source (or to the Rendezvous Point, in the case of shared trees) is preferred. If multiple paths exist with the same cost, the choice will be based on a router internal logic dictated by the specific implementation. However, due to lack of coordination, two routers of equal level may send Join requests related to a same multicast group to two different aggregation routers, even if could notionally send these requests to the same router. As a result, different aggregation routers may propagate towards the core C of the network respective Join requests that are in fact related to one same multicast group, which in turn leads to the traffic for such group being unnecessarily duplicated on plural parallel geographical links. This is far from representing an optimal solution from the viewpoint of the ISP: the valued resources represented by the geographical links are loaded (i.e. caused to be busy) more than required, thus increasing the risk that traffic congestion problems may arise.

Construction and optimization of multicast distribution trees is a topic extensively addressed in research i.a. in Graph Theory, and many potential solutions have been proposed in the literature.

For instance, at the IETF ((Internet Engineering Task Force) level, the PIM-SM and IGMP protocols have been standardized for use by routers in constructing multicast trees and for communication between the hosts and the first routers in the network, respectively. Also, extensions to the RSVP for the construction of Multi Protocol Label Switching—Traffic Engineering Point-to-MultiPoint (MPLS-TE P2MP) tunnels create a tunnel from one entry router to plural exit routers. The RSVP protocol makes it possible to specify the path followed by a tunnel.

Document US-A-2007/177593 discloses a method to improve distribution of multicast traffic in a generic network. The mechanism disclosed therein can be applied to existing routing protocols or new protocols and is based on messages containing the so-called Multicast Optimization Data (MOD) exchanged between the nodes. The MOD contains information that can be used in creating a multicast tree. For instance, a router can send to one neighbouring router a MOD message that contains, in relation to a multicast group, information as to the number of potential upstream routers, of potential downstream routers or downstream routers that have already joined a multicast group. This information can be memorized in a data structure (for instance a table) and used in properly selecting the upstream router to which a Join request is forwarded. Multiple criteria may be applied in selecting the upstream router: e.g. minimizing the duplication of the multicast traffic, balancing the alternative paths or minimizing communication delay.

OBJECT AND SUMMARY OF THE INVENTION

The inventors have noted that the RSVP protocol makes it possible to specify the path followed by a tunnel, and thus it may make it notionally possible to construct multicast distribution trees which may be optimal from the viewpoint of the number of links used. However, the extension of RSVP that allows to construct a P2MP tunnel is still in the development phase. Additionally, the inventors have noted that the construction of the tree via RSVP takes place from the root toward the leaves. Thus, at the present state of the standardization, the leaves of the tree must be configured manually, which inevitably results in the protocol becoming largely inefficient in those dynamic scenarios where receivers are continuously added or removed from the multicast groups.

Finally, the inventors have noted that certain methods as discussed in the foregoing, while addressing the problem of optimizing the multicast traffic, are nevertheless based on the exchange of information via the introduction of a new type of message which may give rise to interoperability problems.

The preceding description of the related art thus shows that the need is still felt for arrangements which may optimize the distribution of the multicast traffic, reducing the resources of network occupied. For instance, making reference to the scenario represented in FIG. 1, the need is felt for arrangements which may allow to avoid the duplication of the traffic around two parallel geographical connections or to balance the different flows of multicast traffic among the same two connections.

The object of the invention is thus to provide satisfactory response to the needs/drawbacks discussed in the foregoing.

According to the present invention, such an object is achieved by means of a method having the features set forth in the claims that follow.

The invention also relates to a corresponding network, a router for use in such a network, as well as a related computer program product, loadable in the memory of at least one computer and including software tails portions for performing the steps of the method of the invention when the product is run on a computer. As used herein, reference to such a computer program product is intended to be equivalent to reference to computer-readable medium containing instructions for computer controlling system coordinated to the performance of the method of the invention. Reference to "at least one computer" is evidently intended to highlight the possibility for the present invention to be implemented in to distributed/modular fashion.

The claims are an integral part of the disclosure of the invention provided herein.

An embodiment of the arrangement described herein avoids the duplication of multicast flows over parallel paths between the source and the receivers, possibly balancing the traffic flows over different upstream router.

A concept underlying certain embodiments of the arrangement described herein is increasing the level of coordination among the routers, thus causing each of them to be aware of the multicast flows received by the router(s) located upstream.

This result is achieved without the need of defining a new communication protocol or extending the existing protocols, but rather deriving the related information from the multicast traffic flows that are active: when a router begins to receive a multicast flow, while propagating the flow to the downstream routers that have requested it, the router in question also sends periodically a packet from the flow to at least one router downstream that has not placed any such request (with a frequency comparable to the frequency used in exchanging the routing and signalling information).

In an embodiment, the arrangement described herein does not require any interaction with protocols such as e.g. IGMP. Nor does the arrangement described herein require the introduction of new messages or new protocols.

The arrangement described herein merely uses multicast packets from which the routers can draw useful information to optimize the transmission traffic.

Practical embodiments of the arrangement described herein do not require implementing any specific communication protocol, as the multicast data packets themselves are used as the source for inferring the information for optimizing the distribution of the multicast traffic.

In an embodiment, certain routers will send multicast packets in a flow also to neighbour routers that have not requested that flow: thus, when a router begins to receive and to distribute a multicast flow, the flow is not merely propagated only to those neighbours that have requested it (that is to the downstream router(s) that have conveyed a Join request related to the group concerned); in addition thereto, that router will also send a fraction of the flow (i.e. a subflow) to downstream routers that have—not—requested that flow.

In an embodiment, the subflow is a fraction of the "original" flow with a data rate, in terms of packets per second, selected (in a fixed manner or possibly rendered adaptive as a function of the number of flows simultaneously handled by the network) in order to produce a reduced traffic.

In an embodiment, routers receiving from an "upstream" router a multicast packet from that subflow (i.e. a flow not requested through them) will not consider it merely as a data packet, but rather draw therefrom information to exploit in selecting a proper upstream router onto which a Join request is to be forwarded; this even in possible contrast with the choice dictated by the multicast routing protocol currently adopted for selecting such an upstream router, where the distribution tree is constructed by always choosing as the upstream router the adjacent router which is closest to the multicast source (or the Rendezvous Point).

Embodiments of the arrangement described herein may select the upstream router following different optimization criteria, for instance by giving the preference to a router that is already receiving the flow of interest or is receiving the smaller/smallest number of multicast flows.

In an embodiment, a downstream router, when receiving such information packets to be used in optimizing the distribution of the multicast flows, may memorize them locally, for instance in a table, in order to use them in identifying the best routing for further Join requests.

The arrangement described herein provides some basic advantages in comparison with operation of conventional multicast transmission networks such as e.g.:

the construction of the multicast tree is optimized with noteworthy savings in terms of network resources; and a balance is achieved in the distribution of different flows over parallel paths in the network.

BRIEF DESCRIPTION OF THE ANNEXED DRAWINGS

The invention will now be described, by way of example only, with reference to the enclosed figures of drawing, wherein:

FIG. 1 has been already discussed in the foregoing;

DETAILED DESCRIPTION OF PREFERRED EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

The headings provided herein are for convenience only and do not interpret the scope or meaning of the embodiments.

FIG. 2 is again representative of an aggregation ("harvest") network whose hierarchical architecture includes two top-level aggregation routers A1 and A2, each having a geographical connection toward a source S via a transit infrastructure ("core" or "backbone" C). The routers A1 and A2 distribute the traffic toward four last-hop router (L1, L2, L3, and L4) through an intermediary level of aggregation (i.e. routers F1, F2, and F3). Each router is immediately connected to one or more routers in the upper level in the hierarchical structure of the aggregation network.

For instance, the router A1 may receive via its geographical connection toward the core C of the network a multicast flow from the source S related to a group (S, G1), and forward it to the router F1 located downstream. This will in turn propagate the traffic to the last-hop router L1 toward the receiver that has requested it.

Figure 1:
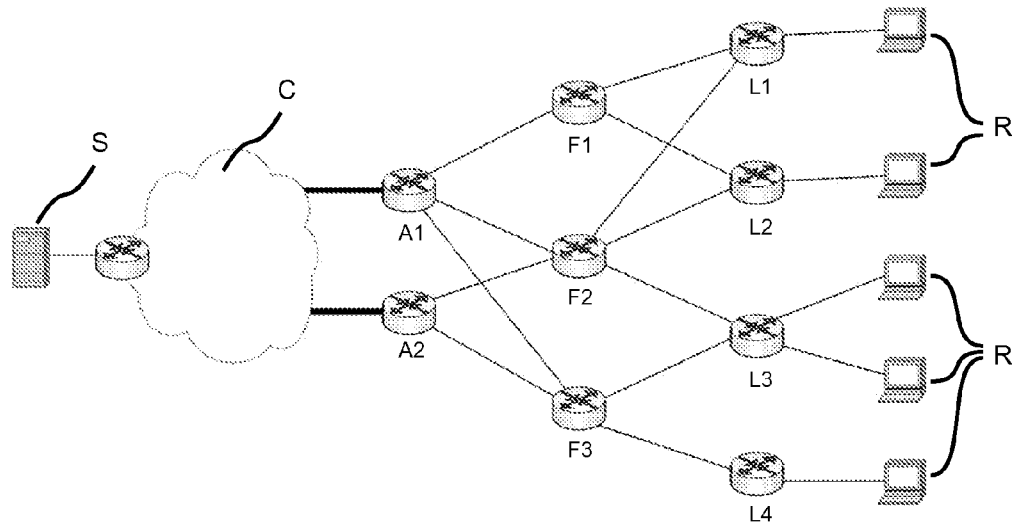
Figure 2:
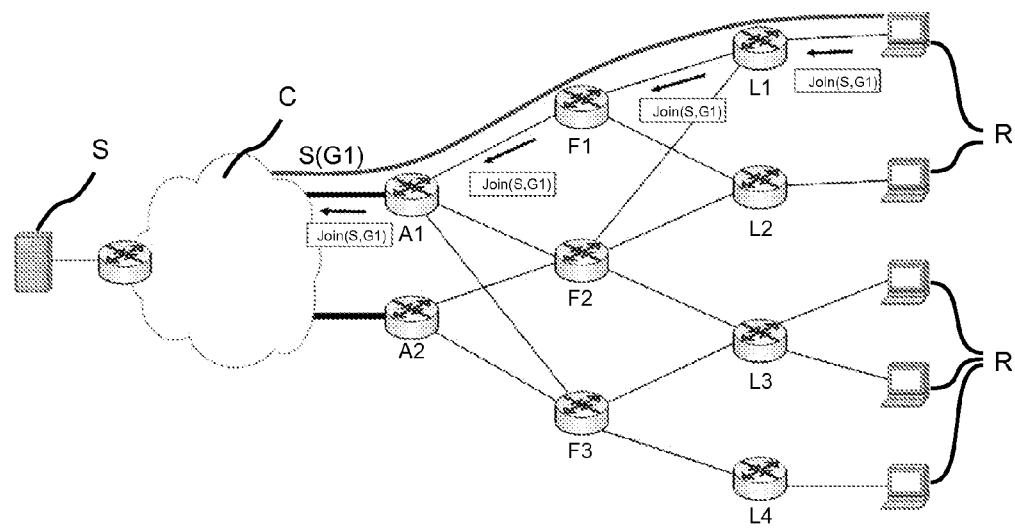
FIG. 2 is representative of the scenario of use of the arrangement described herein.

FIG. 2 schematically shows how this path may have been established as a result of a (first) Join (S, G1) request sent from that receiver and propagated "upstream" via the same routers L1, F1, A1 that will carry the traffic requested.

A further Join request for the same group (S, G1) from another receiver may then reach the router L2. From L2, this further request might be notionally directed to either of the upstream routers F1 or F2 to which L2 has a connection, and the criterion for selecting the upstream router will depend on the algorithms implemented for that purpose in the apparatus. If F2 is selected, this will in turn select as the upstream router either of A1 or A2. In the case A2 is selected, the further Join request will be routed toward the traffic source S by using a route (L2, F2, A2) completely different from the path (L1, F1, A1) which routed the first request.

Two subsequent requests for the same multicast (S, G1) group from two (possibly close) receivers R may thus follow two completely different paths, which corresponds to an inefficient exploitation of the aggregation network resources.

Also, a certain likelihood may exist that, as a result of the two Join requests being routed over two completely different routes, the traffic of the same multicast group (S, G1) might be transmitted to the new requestor via a geographical connection which is far from optimum in terms of resource utilization.

In the following, examples are provided of how these drawbacks may be avoided in the arrangement described herein.

Figure 3:
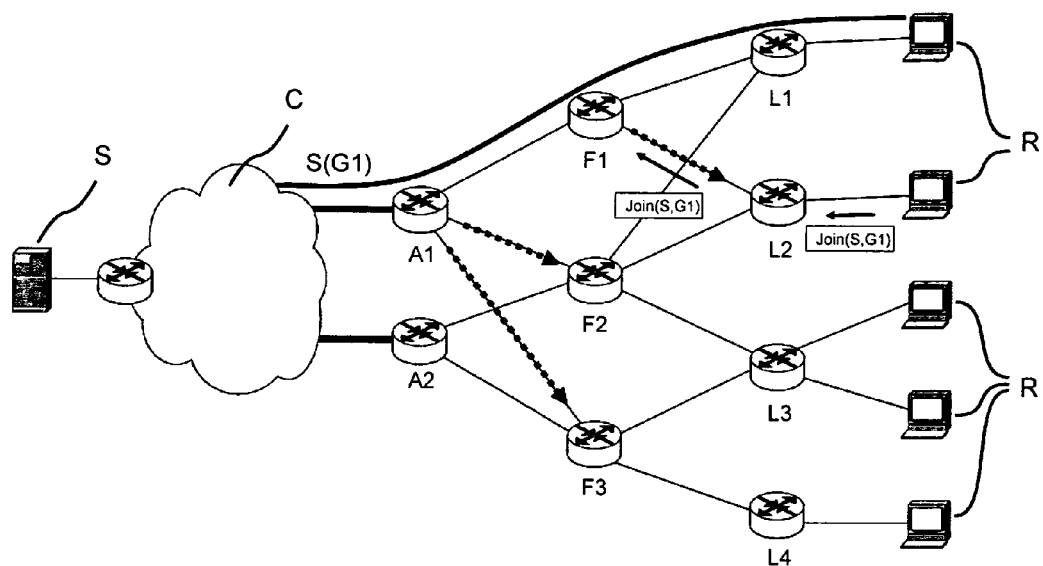
FIGS. 3 to 5 are exemplary of various modes of operation of the arrangement described herein.

With reference to FIG. 3, the aggregation router A1 receiving the flow (S, G1), in addition to sending the multicast traffic towards the router F1 (that has previously sent to the router A1 a corresponding Join request), also derives from that traffic a "subflow", that is some packets extracted therefrom with a pre-determined frequency. The aggregation router A1 sends that subflow to the routers F2 and F3 located downstream as schematically represented by the dashed lines of FIG. 3.

The routers F2 and F3 will receive those packets (that refer to a multicast flow they have not previously requested) and thus become aware of the fact that the multicast group (S, G1) traverses the router A1 and is thus available at that router.

Similarly, in addition to sending the multicast traffic related to the group (S, G1) to the downstream router L1, the router F1 will also propagate a subflow extracted from the multicast traffic related to the group (S, G1) to the router L2.

In the scenario considered herein, a router that has requested a given multicast flow (via a Join request) may receive a packet related to that multicast flow from a router located upstream, which is not the upstream router to which it has sent the Join request: in that case the packet may be ignored inasmuch as the router may receive the same multicast flow from the upstream router to which did request that flow.

By referring again to FIG. 3, if a receiver connected to the router L2 subsequently requests the same multicast flow (S, G1), the router L2 will use the information received for choosing between F1 and F2 the upstream router for forwarding the Join request.

In the specific case, L2 will know that F1 is already receiving the multicast flow (S, G1), and will choose F1 as the upstream router for forwarding the Join request, thus avoiding establishing a new branch through the router F2.

This approach is useful in saving network resources.

Figure 4:
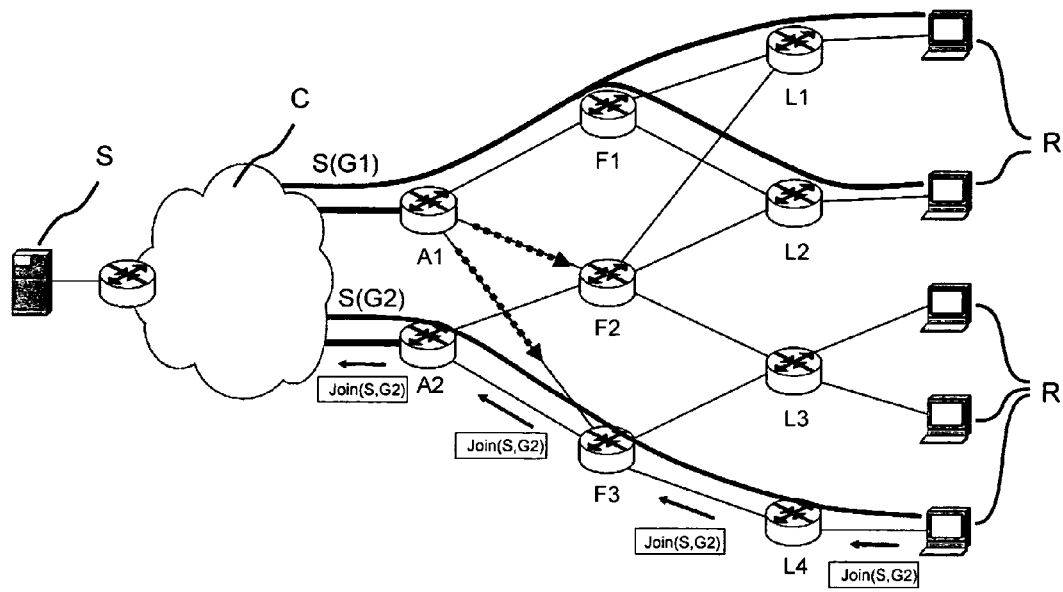

With reference to FIG. 4, one may assume that a receiver attested to L4 asks for a new multicast flow (S, G2). This request is sent from L4 to F3, which in turn may choose either of A1 or A2 as the upstream router for forwarding the Join request. In fact, the group G2 is not received by any of routers in the aggregation network, yet.

Using the information previously received, F3 is however aware of the flows received by A1 and A2, and may thus choose an upstream router that at the moment is less loaded, as it is currently receiving a smaller number of multicast flows. In the exemplary case considered, it will choose the router A2, since A1 is already receiving another flow.

It will thus appreciated that the arrangement described herein allows effective balancing of different multicast flows over parallel paths.

The information propagated to the downstream routers need not be special information, and may be comprised of normal data packets to be multicast over the network. These packets may include the field TTL (Time To Live), which is subjected to a regular decrement, in that each router they traverse may decrement the value of the field by one and may discard the packet if the value reaches the value 0.

This mechanism makes it possible to allot to the information packets a given "range of action". For instance by setting TTL=1, a packet may be given a single hop as its range of action. That range may be extended by setting the field TTL to a value higher than 1.

In the arrangement described herein, the router that sends such a packet may not necessarily be a router traversed by the relative multicast flow: in fact this may simply be a router that has in turn received the packet as originated and propagated downstream from a router which is in fact traversed by that flow. The value of the field TTL makes it possible to derive the distance from the router that has originated the packet: since that value is decremented by one at each router it traverses, the smaller the value in the TTL field, the larger the distance from the router that has originated the packet and is traversed by the relative multicast flow.

When a router receives a data packet related to a same multicast group from plural routers located upstream, the receiving router may select the upstream router for forwarding the Join request as a function of the value in the field TTL contained therein (e.g. by selecting the router whose packets have the higher value for the field TTL, which means that these packets have traversed fewer routers, i.e. travelled a shorter path in terms of hops).

Figure 5:
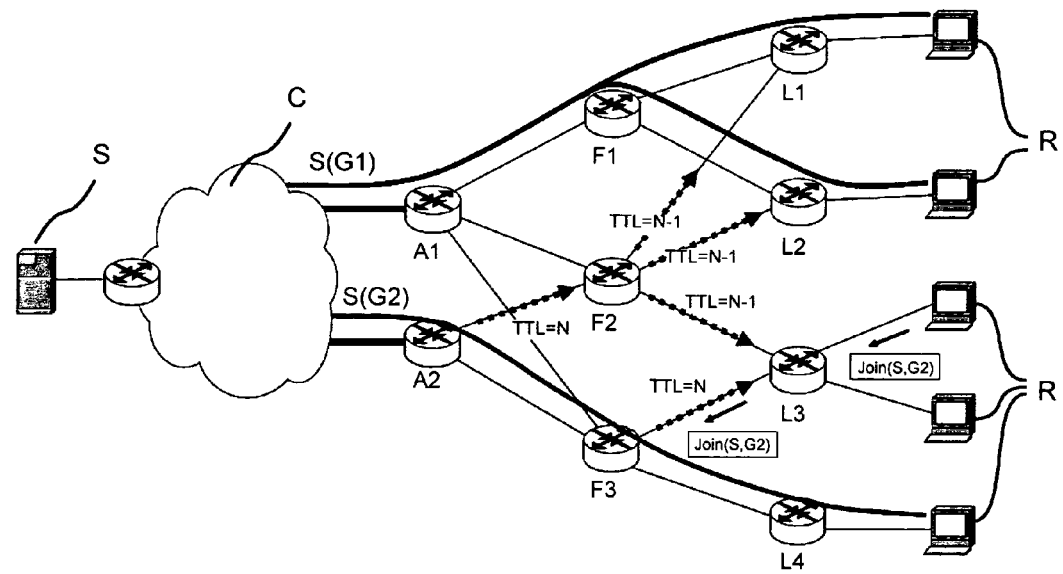

For instance, FIG. 5 shows an exemplary case where the flow (S, G2) is multicast via i.a. the routers A2, F3, and L4 to be forwarded to a receiver R. The routers A2, F3 also send to the routers F2 and L3 that have not sent a request for that flow a subflow derived from the flow (S, G2) including packets where the value of the field TTL is set to N>1. The router F2 in turn forwards these packets to the routers L1, L2, and L3 arranged downstream after decreasing the value for TTL to N−1.

In the exemplary case considered, the router L3 will thus receive the same information related to the flow (S, G2) from two upstream routers, namely F2 and F3. This information will be in the form of packets having values for TTL equal to N and N−1, as received from the routers F3 and F2, respectively.

If subsequently a receiver connected to the router L3 requests the multicast flow (S, G2), the router L3 will choose the upstream router for forwarding the Join request as a function of the values of the field TTL in the packets of information that has received.

In the packet received from F3 TTL=N, which means that F3 is already receiving the flow requested.

Conversely, in the packet received from F2 TTL=N−1, which means that F2 is not receiving that flow, but is located at one hop's distance from a router that is already receiving the flow.

The router L3 will thus forward the Join request to F3 as the upstream router, which is thus selected as the one whose data packets of information have the higher value for TTL.

The value for N set in the field for TTL depends on the specific implementation, and may be selected coherently for all apparatus in the network in order to allow a meaningful comparison between information data packets received by given router from different routers located upstream of it.

The information contained in the data packets may be memorized locally in the router, for instance in a chart or table, and used to select the upstream router for forwarding a Join request to properly construct a multicast distribution tree.

Table 1 below shows a possible format for such a chart/table.

| ROUTER | MULTICAST GROUP | TTL |
| --- | --- | --- |
| $R_1$ | $(S_1, G_1)$ | N−2 |
| $R_1$ | $(S_1, G_2)$ | N |
| $R_1$ | $(S_2, G_2)$ | N |
| $R_2$ | $(S_1, G_2)$ | N−2 |
| $R_3$ | $(S_1, G_1)$ | N |
| $R_3$ | $(S_1, G_2)$ | N−1 |
| ... | ... | |
| $R_n$ | $(S_2, G_2)$ | N−1 |

There, the first column identifies the upstream router from which the information data packet has been received; the second column identifies the multicast group to which the packet relates; the third column contains the value for the field TTL allotted to the packet (in the particular case N=1, the third column does not make proper sense inasmuch as the packets have a range of action equal to one hop only).

When a router receives a Join request related to a given multicast flow not yet received by the router, and the router is connected to the source of the flow over plural paths, the router uses the contents of the chart to select the upstream router for forwarding the Join request.

By processing the chart, the router will be able to determine, for each router located upstream (i.e. at a higher hierarchical level in the aggregation network):

what routers are already receiving the requested flow,
for those routers that are not receiving that flow, the distance in terms of hops to the nearest router that is already receiving that flow,
the overall multicast flows a given router is already receiving.

The router/node may thus adopt any of these parameters as a criterion for selecting the upstream router.

Figure 6:
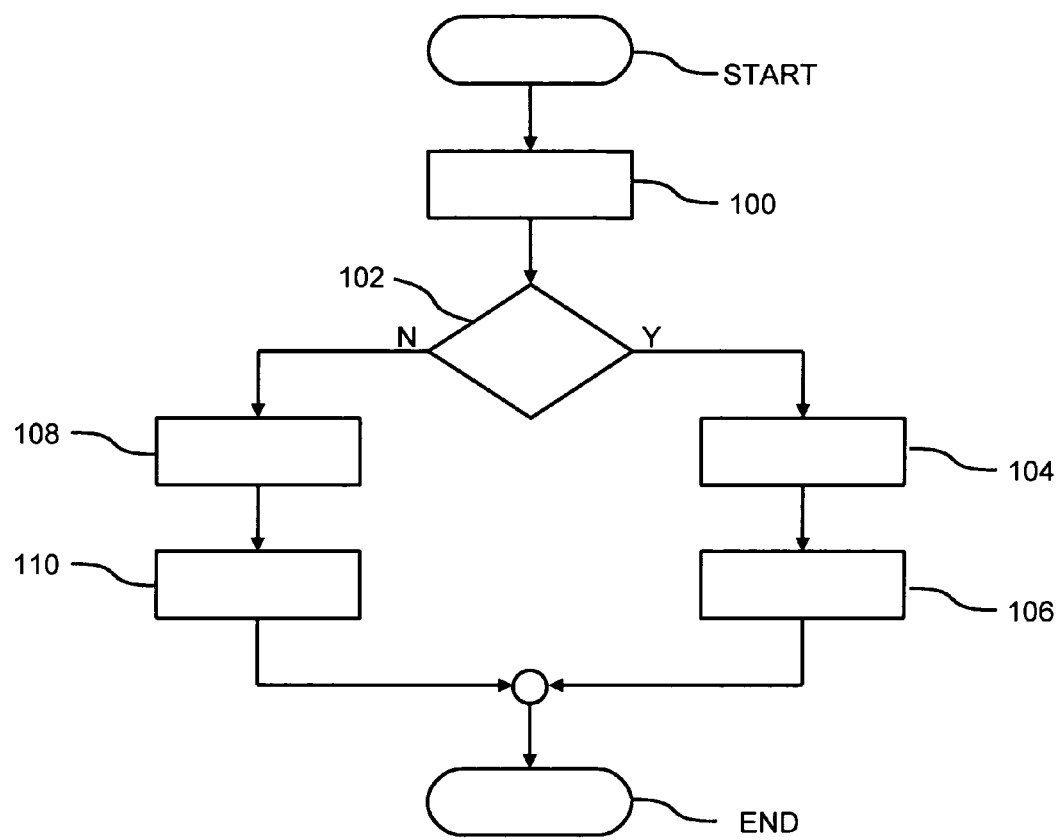
FIGS. 6 and 7 are flow-charts exemplary of operation of the arrangement described herein.

The flow chart of FIG. 6 is an exemplary representation of the operations that any of the routers other than the last-hop routers may perform according to the method described herein, when it receives a multicast packet from an upstream router. The flow chart of FIG. 6 is described by taking as reference the scenario of FIG. 5.

After a START step, when in a step 100 the routers F2 and F3 receive from the upstream router A2 a multicast packet related to the flow (S, G2), in a step 102 they check whether that packet deals with a flow that they have "requested" (i.e. a flow for which they have conveyed a Join request).

The check may yield different results for different routers.

For instance, the router F3 has requested that flow, and the check of step 102 yields a positive result. Therefore, in a step 104, the router F3 propagates that flow to the downstream router L4 which did pass the request according to the normal procedure of operation multicast. Additionally, in a step 106, the router F3 also sends the informative "subflow" (a fraction of the same flow) to the downstream router that has not requested that flow: in the case of FIG. 5, this is the router L3.

Conversely, the router F2 has not requested the flow (S, G2), and the check of step 102 yields a negative result. The router F2 thus simply memorizes, in a step 108, the information related to the flow (S, G2) received from the router A2 and in a step 110 propagates the corresponding packet to its downstream router(s)—i.e. L1, L2, and L3 in the instant case—possibly after decrementing the field TTL.

Obviously, the mechanism of propagating the information downstream described in the foregoing may apply to all the routers other than the last-hop routers L1, L2, L3, and L4 included in the lowest level in the architecture of the aggregation network: these last-hop routers have no lower level routers towards which they can propagate any subflow as described in the foregoing.

Figure 7:
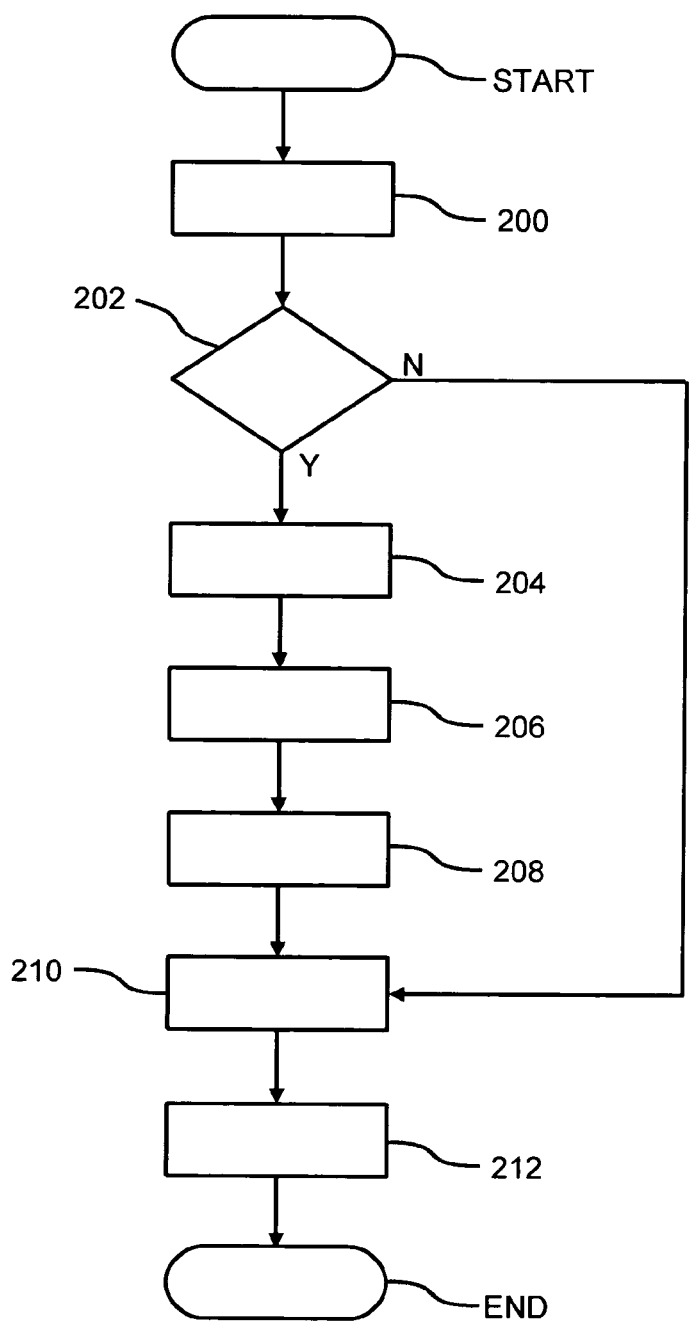

The flow chart of FIG. 7 is an exemplary representation of the operations that any of the routers (including the last-hop routers L1 to L4) may perform for requesting and transmitting a multicast flow according to the method described herein. The flow chart of FIG. 7 is again described by taking as reference the scenario of FIG. 5.

After a START step, when the e.g. router L3 receives—in a step 200—a request related to the multicast group (S, G2), a check is first made in a step 202 as to whether the request related to a "new" flow or to a flow the router is already receiving.

In the exemplary case considered, the router L3 is not receiving the flow (S, G2) yet. The check of step 202 yields a positive result, and, in step 204, the router L3 will choose an upstream router for sending the Join request.

This choice is made on the basis of information related to the flow (S, G2) as possibly received from upstream routers and memorized. In the case such information is not available the router L3 will simply select the upstream router corresponding to the shortest path toward the source (or satisfying any other optimization criterion as possibly adopted).

In the exemplary case considered, information related to the flow (S, G2) is available with the router L3 as this has been previously received from the upstream routers F2 and F3 and memorized locally.

Specifically, the "subflow" packets received from F2 will have TTL=N−1, while those received from F3 will have TTL=N. The router L3 may thus decide to send the Join request to the router F3 (step 206) as this will enable to "hook" the flow (S, G2) with a single hop by reaching a branch of the multicast tree already constructed for permitting multicast distribution of that flow.

This is in contrast to the two hops required to "hook" the flow (S, G2) by sending the Join request to the router F2 and then on to the router A2.

At this point—in a step 208—the router L3 will begin to receive the flow (S, G2).

In the case the router considered is not a last-hop router like the router L3, in a step 210 the router will forward the flow (S, G2) to the downstream router that requested it. The same operation will be performed immediately after the check of step 202 when that check yields a negative result, indicative of the fact that the request received in the step 200 related to a flow the router is already receiving.

Again, in the case the router considered is not a last-hop router like the router L3, the router will also propagate a fraction of the flow (subflow) to the downstream router(s) that have not requested the flow as previously detailed in connection with FIG. 6.

Without prejudice to the underlying principles of the invention, the details and embodiments may vary, even appreciably, with respect to what has been described by way of example only, without departing from the scope of the invention as defined by the annexed claims.

The invention claimed is:

1. A method of distributing multicast information flows from at least one source to a plurality of user terminals over a network including aggregation routers arranged in hierarchical levels, said hierarchical levels including a last-hop level nearest to said plurality of user terminals, the method including the steps of:
    receiving a request for an information flow from a user terminal,
    defining a distribution path having a plurality of said aggregation routers for transmitting said information flow to the user terminal,
    deriving, by a first of said plurality of aggregation routers used to transmit said information flow at a level of said hierarchical levels other than said last-hop level, an information subflow from said information flow, wherein the information subflow includes a subset of the information included in the information flow,
    propagating, by said first router, said information flow towards a second of said plurality of aggregation routers used to transmit said information flow and said information subflow towards at least one lower-level aggregation router different from a lower-level router in said plurality of aggregation routers used to transmit said information flow,
    receiving, at the at least one lower-level aggregation router that received the propagated information subflow, a further request for said information flow,
    forwarding said further request towards at least one aggregation router that derived said information subflow from said information flow,
    deriving, by at least two of said plurality of aggregation routers used to transmit said information flow at a level of said hierarchical levels other than said last-hop level including said first router, said information subflow from said information flow,
    propagating, by said at least two routers, said information subflow towards at least one lower-level aggregation router different from a lower-level router in said plurality of aggregation routers used to transmit said information flow,
    receiving, by the at least one lower-level aggregation router, said information subflow propagated thereto from said at least two upper-level aggregation routers, and
    forwarding said further request through the one of said at least two upper-level aggregation routers defining a shorter path to access said information flow.

2. The method of claim 1, wherein propagating said information subflow comprises propagating said information subflow towards a plurality of lower-level aggregation routers.

3. The method of claim 1, including identifying the one of said at least two upper-level aggregation routers defining a shorter path to access said information flow as the aggregation router having a smaller number of hops to a router in said plurality of aggregation routers used to transmit said information flow.

4. The method of claim 1, wherein said information subflow includes at least one data packet derived from said information flow.

5. The method of claim 3, wherein said information subflow includes at least one data packet derived from said information flow, the method further including:
    incorporating in said at least one data packet a counter value,
    decrementing said counter value at each aggregation router traversed by said at least one data packet, and
    identifying the one of said at least two upper-level aggregation routers defining a shorter path to access said information flow as the aggregation router propagating packets having a higher value for said counter value.

6. The method of claim 5, wherein said counter value is a Time To Live counter associated with said at least one data packet.

7. A non-transitory computer readable medium including software code portions stored thereon that, when executed by at least one computer, perform the method of claim 1.

8. A network including aggregation routers arranged in hierarchical levels for distributing multicast information flows from at least one source to a plurality of user terminals wherein the network is configured to implement the steps of:
    receiving a request for an information flow from a user terminal,
    defining a distribution path having a plurality of said aggregation routers for transmitting said information flow to the user terminal,
    deriving, by a first of said plurality of aggregation routers used to transmit said information flow at a level of said hierarchical levels other than said last-hop level, an information subflow from said information flow, wherein the information subflow includes a subset of the information included in the information flow,
    propagating, by said first router, said information flow towards a second of said plurality of aggregation routers used to transmit said information flow and said information subflow towards at least one lower-level aggregation router different from a lower-level router in said plurality of aggregation routers used to transmit said information flow,
    receiving, at the at least one lower-level aggregation router that received the propagated information subflow, a further request for said information flow,
    forwarding said further request towards at least one aggregation router that derived said information subflow from said information flow,
    deriving, by at least two of said plurality of aggregation routers used to transmit said information flow at a level of said hierarchical levels other than said last-hop level including said first router, said information subflow from said information flow, propagating, by said at least two routers, said information subflow towards at least one lower-level aggregation router different from a lower-level router in said plurality of aggregation routers used to transmit said information flow, receiving, by the at least one lower-level aggregation router, said information subflow propagated thereto from said at least two upper-level aggregation routers, and forwarding said further request through the one of said at least two upper-level aggregation routers defining a shorter path to access said information flow.

9. A router comprising;
a processing unit configured to perform at least one of:
A)—receiving a multicast information packet from an upper level router in a network, and checking whether said multicast information packet received corresponds to an information flow requested from a user terminal, and
  i) if the router is one of a plurality of aggregation routers in a multicast distribution path used to transmit said information flow to the user terminal: forwarding said information flow over said multicast distribution path and propagating an information subflow to at least one lower-level aggregation router different from a lower-level router in said plurality of aggregation routers in the multicast distribution path, wherein the information subflow includes a subset of the information included in the information flow,
  ii) if the router is an aggregation router different from a router in said multicast distribution path: locally storing said multicast information packet received from said upper level router and forwarding said multicast information packet received from said upper level router to at least one lower-level aggregation router different from a router in said multicast distribution path; and
B)—receiving a request for an information flow from a lower level router in a network, and checking whether the router is one of a plurality of aggregation routers used to transmit said information flow requested from a user terminal, and
  i) if the router is one of the plurality of aggregation routers in a multicast distribution path used to transmit said information flow: forwarding said requested information flow to said lower level router from which said request was received,
  ii) if the router is an aggregation router different from a router in said multicast distribution path: forwarding said request for said information flow towards at least one upper level router that transmitted an information subflow to the router, receiving from said at least one upper level router said requested information flow, and forwarding said requested information flow to said lower level router from which said request was received.

* * * * *